United States Patent Office 3,518,227

Patented June 30, 1970

1

3,518,227

ORTHOESTER STABILIZED POLYVINYL CHLORIDE RESINS

Louis L. Wood, Washington, D.C., assignor to W. R. Grace & Co., New York, N.Y., a corporation of Connecticut No Drawing. Original application Dec. 12, 1966, Ser. No. 612,066. Divided and this application May 22, 1968, Ser. No. 750,689

Int. Cl. C08f *45/58*

U.S. Cl. 260—45.95 6 Claims

ABSTRACT OF THE DISCLOSURE

Polyvinyl chloride resins can be thermally stabilized by the addition of an orthoester compound having the formula:

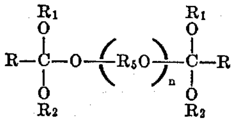

wherein R is selected from the group consisting of hydrogen, alkyl, phenyl, phenylalkyl, alkylphenylalkyl, halophenyl, nitrophenyl and alkenyl; $R_1$ and $R_2$ are selected from the group consisting of alkyl, phenyl, phenylalkyl, alkylphenyl and alkylphenylalkyl; and $R_5$ is selected from the group consisting of alkylene, phenylene, alkyl, alkylene, alkenylene, alkenylalkoxyalkyl alkylene, and alkynyne; and *n* has a value of from 1 to 4. An addition of a polyhydric alcohol will generally further increase the thermal stability.

The present invention is a division of my application 612,066, filed Dec. 12, 1966 now abandoned, which in turn is a continuation-in-part of my earlier filed applications, Ser. Nos. 403,353, filed Oct. 12, 1964 now abandoned and 499,093, filed Oct. 20, 1965 now abandoned.

The present invention relates to the stabilization of resins, and more specifically to a novel stabilization agent for stabilizing vinyl chloride polymers and copolymers against the degradation effects of elevated temperatures.

It is well known that vinyl chloride containing resins degrade at elevated temperatures. When vinyl chloride polymers and copolymers are subjected to molding temperatures in excess of about 150° C. they tend to discolor. Serious discoloration occurs even in the relatively short period of time required for a molding operation.

To date, numerous stabilizers have been suggested for use in vinyl chloride type resins. The most satisfactory of these stabilizers comprise tin, lead and cadium containing compounds. These compounds, while performing satisfactorily where toxicity is not a problem, can not be used where the treated polymer is to come into contact with foodstuffs and the like.

As of present, a highly effective polyvinyl chloride stabilizer which does not possess toxic characteristics or propensities has not been developed.

It is therefore an object of the present invention to provide a novel class of polyvinyl chloride stabilizers.

It is another object to provide novel stabilizers for polyvinyl chloride containing resins which substantially enhance thermal stability of said resins.

It is a further object to provide a class of polyvinyl chloride stabilizers which are non-toxic and may be used in resins which are used in the packaging of foodstuff materials.

These and still further objects of the present invention will become readily apparent to one skilled in the art from the following detailed description and specific examples.

2

Broadly, my present invention contemplates as polyvinyl chloride stabilizers compounds containing the following ortho ester grouping:

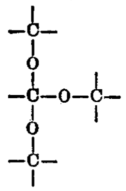

wherein the indicated unsatisfied valences are occupied by hydrogen or organic radicals. It is also contemplated that these orthoesters may be effectively combined with polyhydric alcohols to give a superior degree of stabilization.

More specifically, I have found that if from about 1% to about 10% by weight of a compound containing an ortho ester grouping is admixed with polyvinyl chloride, the ortho ester compound will stabilize the polyvinyl chloride towards heat induced degradation. Furthermore, this stabilization effect may be enhanced by the addition of polyhydric alcohols.

The ortho esters used in the practice of the present invention may be broadly defined as those ortho esters which possess at least one of the above defined ortho ester groups, and which are compatible with the polyvinyl chloride resins at the processing temperatures indicated. By the term "compatible" it is meant that the ortho ester used should homogenously blend with the polyvinyl chloride and should have a relatively low vapor pressure at processing temperatures so as not to cause excessive forming of the resins at the processing temperatures encountered.

Typical structures of suitable ortho esters which may be used in the practice of my invention are:

(1)

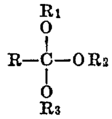

wherein R may represent hydrogen, alkyl, phenyl, phenylalkyl, alkylphenylalkyl, halophenyl, nitrophenyl and alkenyl; $R_1$, $R_2$, $R_3$ may be alkyl, phenyl, phenyl-alkyl, alkylphenyl, and alkylphenyl-alkyl (2)

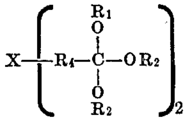

wherein $R_1$, $R_2$ and $R_3$ has the meaning given in (1) above; $R_4$ may be alkylene, phenylene, and alkylphenylene; and X represents oxygen and sulfur.

(3)

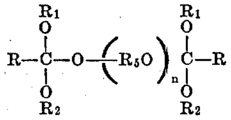

wherein R, $R_1$, and $R_2$ have the meaning given above (1); $R_5$ may be alkylene, phenylene, alkyalkylene, alkenylene, alkenylalkoxy-alkylalkylene and alkynylene; and *n* has a value of from 1 to 4.

(4)

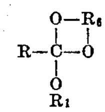

wherein R and $R_1$ have the meaning given in (1) above;

and $R_6$ may be alkylene, alkylalkylene, and alkenylalkoxyalkylalkylene.

(5)

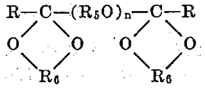

wherein R, $R_5$, $R_6$ and *n* have the meanings given above.

(6)

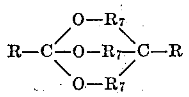

wherein R has the meaning given above and $R_7$ is alkylene.

The reaction products of lower orthoesters such as triethyl orthoacetate and triethylorthoformate with polyols such as glycerol, sorbitol, and mannitol yield complex esterified products.

Specific examples of orthoesters which may be used in the present invention along with a general description of how the orthoester compound may be prepared are given in the following paragraphs. (The numeral designations will be used in the subsequent specific examples and claims to identify these compounds.)

The following three methods may be used to prepare the following orthoesters:

(A) Iminoester route, as set forth in Pinner, Ber., 16 356, 1644 (1883).

The appropriate nitriles are reacted with one equivalent of dry hydrogen chloride and one equivalent of alcohol to form an iminoester hydrochloride which is then alcoholyzed with an excess of alcohol to form the orthoester. The reaction may be outlined as follows:

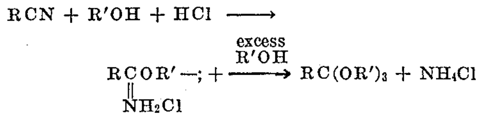

A dinitrile can be used as follows:

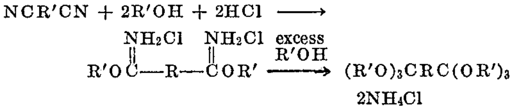

Furthermore, diols may be used at either one or both steps of the synthesis.

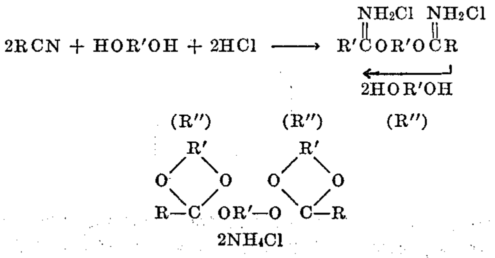

(B) Exchange reaction as described by Mkhitaryan, V. J. Gen. Chem. (USSR) 8 1361 (1938).

The alkoxy groups of a readily available orthoester such as triethyl orthoacetate or formate are displaced by a higher boiling alcohol or polyol as follows:

$$CH_3C(OC_2H_5)_3+3ROH—CH_3C(OR)_3+3C_2H_5OH$$

Furthermore, the reaction may be carried out in two steps with two different alcohols or polyols including polyols ranging from diols to hexols. Typically the reaction may be illustrated for a diol as follows:

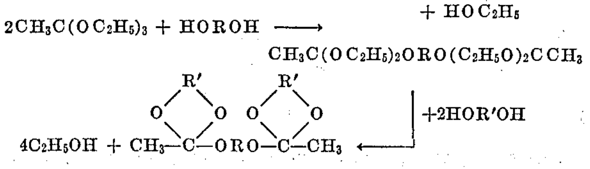

When more complex polyols including triols through hexols are used, many complex polymeric products are possible. However, these reaction products are formed by continuing the reaction until the required amounts of lower alcohol has been removed. That is the exchanye reaction is continued until the calculated amount of lower alcohol is displaced by the higher alcohols.

(C) Alcoholysis of triholomethyl groups as set forth by Sah, P. and Ma, S.T., J. Am. Che. Soc. 54 2964 (1932).

The appropriately substituted trichloromethyl compound is treated with a metal alkoxide.

$$aCCl_3+3NaOR'—RC(OR')_3+3NaCl$$

I

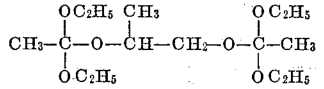

This compound is conveniently prepared by routes A or B.

II

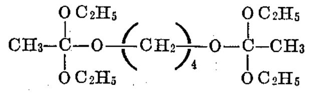

This compound is prepared by routes A or B.

III

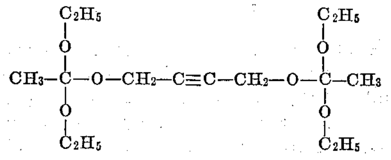

This compound is prepared by routes A or B.

IV

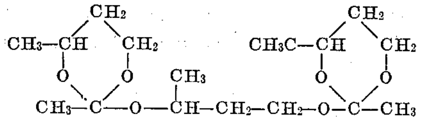

This compound is prepared routes A or B.

V

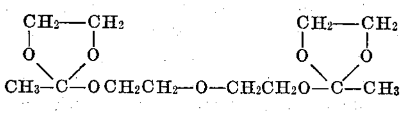

This compound is prepared by routes A or B.

VI.

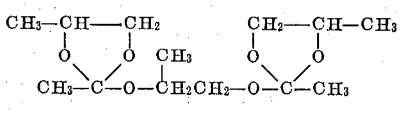

This compound is prepared by routes A or B.

VII.

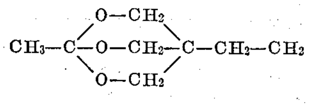

This compound is prepared by route A.

VIII.

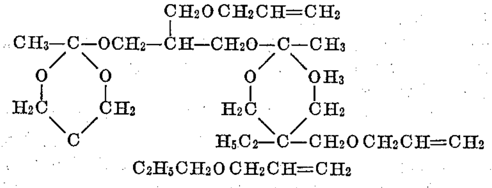

This compound is prepared by route B.

IX $(CH_3CH_2CH_2O)_3C(CH_2)_4C(OCH_2CH_2CH_3)_3$

This compound is prepared by routes A or B.

X.

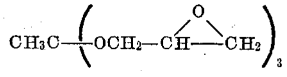

This compound is prepared by route B.

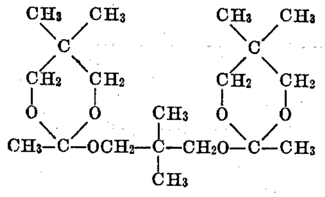

This compound is prepared by routes A and B.

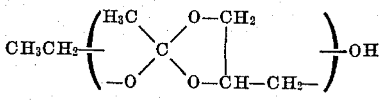

(XII) $CH_3C(OC_2H_5)_3$

This compound is prepared by route A.

(XIII) $(CH_3O)_3C—CH_2CH_2SCH_2CH_2C(OCH_3)_3$

This compound is prepared by route A.

(XIV) $(C_2H_5O)_3C—CH_2—CH_2SCH_2CH_2—C(OC_2H_5)_3$

This compound is prepared by route A.

(XV) $(CH_3O)_3CCH_2CH_2OCH_2CH_2C(OCH_3)_3$

This compound is prepared by route A.

(XVI) $CH_3(CH_2)_{10}C(OCH_3)_3$

This compound is prepared by route A.

XVII.

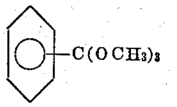

This compound is prepared by route C.

(XVIII)

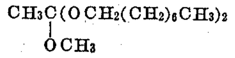

This compound is prepared by route A.

(XIX) $(CH_3O)_3C(CH_2)_4C(OCH_3)_3$

This compound is prepared by route A.

(XX) $(C_2H_5O)_3C(CH_2)_4C)OC_2H_5)_3$

This compound is prepared by route A.

(XXI)

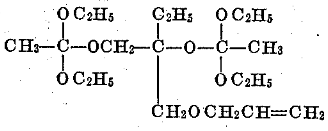

This compound is prepared by route B.

(XXII)

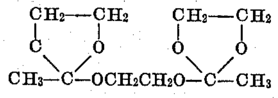

This compound is prepared by route B.

(XXIII)

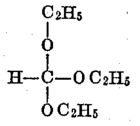

This compound may be prepared by routes A, B, or C.

(XXIV)

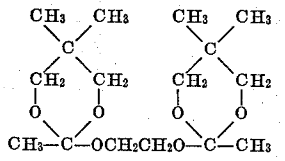

This compound may be prepared by route B.

(XXV)

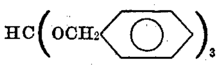

This compound was prepared by route B.

(XXVI)

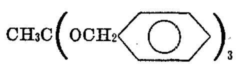

This compound was prepared by route B.

(XXVII)

Poly(glyceryl orthoformate)

This compound was prepared by way of route B using one mole of triethyl orthoacetate and one mole of glycerol.

(XXVIII)

Poly(sorbityl orthoacetate)

This compound was prepared by route B from 2 moles of triethyl orthoacetate and one mole of sorbitol.

(XXIX)

Poly(mannityl orthoacetate)

This compound was prepared by route B using 2 moles of trietyl orthoacetate and one mole mannitol.

The effectiveness of the present orthoester stabilizers may be enhanced by adding thereto from about 0.1 to about 10 moles of a high boiling alcohol per mole of orthoester.

Typical alcohols which may be added possess the general structure $R'(OH)_x$ wherein R' is an organic radical and $x$ has a value of from 1 to 6. Preferably these alcohols have a boiling point in excess of about 175° C.

In the above formula R' may be alkyl, alkylphenyl, phenylalkyl, alkylene, phenylene, polyalkoxyalkylene and trivalent counterparts thereof. Typical polyhydric alcohols useful in the practice of the present invention are *o, m, p*-xylene, $\alpha,\alpha$-diol, trimethylolpropane monopropyl ether, trimethylolpropane monoallyl ether, propylene glycol, diethylene glycol, dimethyloctadiynediol, pentaerythritol, trimethylolpropane, neopentylglycol, benzylalcohol, cetyl acohol and dipentaerythritol.

Polyvinyl chlorides which are treated in accordance with the practice of my present invention are those vinyl chloride polymers and vinyl chloride copolymers having a number average molecular weight from about 10,000 to about 150,000 and a weight average molecular weight of from about 20,000 to 1,000,000. These vinyl chloride polymers and copolymers are well known to those skilled in the art and comprise vinyl chloride homopolymers as well as vinyl chloride copolymers which are prepared by copolymerizing vinyl chloride with a copolymerizable monomer such as unsaturated esters which include vinyl acetate, vinyl formate, vinyl benzoate, vinyl stearate, vinyl oleate, as well as diethyl maleate and diethyl formate. Copolymers may also be prepared by copolymerizing vinyl chloride with an acrylic ester such as methyl-, ethyl-, butyl- and octyl acrylate. It is also contemplated that the vinyl chloride copolymers may be prepared by polymerizing vinyl chloride with vinylidene chloride. The above mentioned copolymers may contain from 0 to 20, and even 40% by weight of copolymerizable monomer.

The stabilization agents, namely the ortho esters contemplated herein, are incorporated with the vinyl chloride polymer and copolymers by any conventional means. The blending may be conveniently carried out first preparing a slurry of finely divided polymer in a solvent for the ortho ester such as methanol, acetone, ethyl ether. The solution is then separated from the slurry and the polymer particles are dried. This results in polymer particles which are thoroughly coated with the ortho esters set forth herein. It is also contemplated that the blending may be achieved by milling the polymer at the softening temperatures therefor until an intimate blend of the stabilization agent with the polymer is achieved. Milling is generally conducted at conventional temperatures of 150 to 200° C. for a period of time sufficient to obtain thorough blending of the stabilization agent with the polymer.

The stabilized vinyl chloride polymers and copolymers contemplated herein may be used in the formation of rigid polyvinyl chloride molded articles. These rigid molded pieces are formed in extrusion and injection molding devices which are well known to those skilled in the art and which operate in the neighborhood of 150 to 200° C. The stabilization agents contemplated herein effectively stabilize the vinyl chloride polymer and copolymer during the molding process and make it possible to produce rigid moldings having a low degree of color change and good clarity.

It is also contemplated that the polyvinyl chloride resins stabilized by the present stabilizers may be admixed with various plasticizers such as high boiling esters including the alkyl phthalates, phosphates, adipates, sebacates, azelates, and various polymeric type ester plasticizers. Also the present composition may contain other additives such as Zn, Mg, Sn and Ca salts of carboxylic acids, and phosphate esters. Furthermore, the resins may be included in plastisol type preparations which are fabricated by dipping and deposit type molding techniques.

Having described the basic aspects of my present invention the following specific examples are given to illustrate embodiments thereof.

EXAMPLE I

In the examples tabulated below 9.5 g. portions of powdered Vygen 120, a high molecular weight polyvinyl chloride resin, was slurried in solutions which comprised 20 ml. of methanol and 0.5 g. of the various stabilizer compounds listed below. The resultant slurries were evaporated to dryness with constant agitation at from 40 to 60° C. and under 60 mm. Hg pressure. 3.5 g. of the polyvinyl chloride mixtures were then pressed into plaques which measured 1" x 3" and 5 mils in thickness on a press heated to 200° C. and exerting 10,000 p.s.i. for the times listed in the table below. The color of the resultant plaques were measured by comparison with the standard Gardner color scale (0.0=colorless to 5.0=dark amber). The less color developed in the plaque the more effective is the stabilizer.

| Run | Stabilizer | Gardner color index at various times (minutes) | | | |
|---|---|---|---|---|---|
| | | 2 | 5 | 10 | 15 |
| 1 | XIV | 2.0 | 2.25 | 2.5 | 2.5 |
| 2 | XVII | 3.0 | 3.0 | 3.0 | 3.0 |
| 3 | Dibutyl tin dilaurate | 7 | 11 | 15 | >15 |
| 4 | None | 15 | >15 | >15 | >15 |

Examples 1 and 2 containing the ortho esters contemplated herein are effectively stabilized. Example 3 which contained the well known stabilizer dibutyltin dilaurate rapidly discolored under the same conditions as did Example 4 which contained no stabilizer.

EXAMPLE II

In the following runs particulate polyvinyl chloride having a number average molecular weight of about 38,000 was dry blended with various amounts of orthoester and/or polyhydric alcohol. These samples were then placed in the mixing chamber of a Brabender Plastograph at 190° C. and open to the air. A roller speed of 60 r.p.m. was used to knead the polymer formulations. The Brabender Plastograph continuously records the torque required to knead the mass. From the torque values one can determine:

(a) The time required for the powder mixture to fuse into a workable plastic mass (flux time)
(b) The force required to work the plastic mass (average torque value)
(c) The onset of crosslinking (decomposition time).

The actual temperature of the plastic mass was also continuously measured. Small samples of the polymers were also removed periodically from the mixing chamber and their color compared to those of the standard Gardner scale.

TABLE II

| Run | Stabilizer (numerals refer ortho-ester described previously) | Concentration, parts per hundred | Flux time, min. | Decomposition time after flux min. | Torque, kg. | Polymer (temp., ° C.) | Color (Gardner scale: 0=colorless; 15=brown | | | | |
|---|---|---|---|---|---|---|---|---|---|---|---|
| | | | | | | | 2 min. | 4 min. | 10 min. | 15 min. | 20 min. |
| 1 | V | 5.0 | 2.0 | 20.0 | 1.25 | 199–204 | 1.5 | 1.8 | 1.5 | 1.5 | 1.5 |
| 2 | V<br>m-Xylene α,α'-diol | 5.0<br>2.0 | 1.5 | 26.0 | 1.25 | 193–199 | 0.2 | 0.2 | 0.5 | 1.0 | [1] 1.2 |
| 3 | V<br>p-Xylene α,α'-diol | 5.0<br>2.0 | 2.0 | 17.0 | 1.3 | 195–208 | 1.0 | 1.0 | 1.0 | 1.5 | |
| 4 | V<br>o-Xylene α,α'-diol | 5.0<br>2.0 | 1.5 | 22.0 | 1.1 | 190–198 | 1.5 | 1.5 | 1.5 | 1.5 | [2] 1.5 |
| 5 | m-Xylene α,α'-diol | 2.0 | 3.5 | 10–13.5 | 1.9–1.5 | 190–210 | 1.5 | >15 | Black | | |
| 6 | p-Xylene α,α'diol | 2.0 | 3.5 | 3.0–8.0 | 1.9–1.7 | 190–210 | 1.5 | >15 | Black | | |
| 7 | o-Xylene α,α'-diol | 2.0 | 2.5 | 3.5 | 1.9–1.7 | 190–198 | >15 | Black | | | |
| 8 | V<br>Trimethylol propane monoallyl ether (TMPA). | 5.0<br>2.0 | 1.5 | 34.0 | 1.4–1.2 | 190–197 | 1.0 | 2.0 | 2.0 | 2.0 | [3] 2.0 |
| 9 | TMPA | 2.0 | 1.0 | 3.0 | 1.9–2.2 | 180–194 | Black | | | | |
| 10 | V | 5.0 | 2.0 | 14.5 | 1.3–1.4 | 190–203 | 1.5 | 1.5 | 1.5 | 1.5 | |
| 11 | V<br>1,2-propylene glycol | 5.0<br>2.0 | 2.0 | 12.5 | 1.4 | 190–200 | 1.0 | 1.0 | 1.0 | | |
| 12 | V<br>Diethylene glycol | 5.0<br>2.0 | 2.5 | 17.0 | 1.8–2.0 | 190–202 | 1.0 | 1.0 | 1.0 | 1.0 | |
| 13 | V<br>Oxidized polyethylene (OPEX 660 MI). | 5.0<br>2.0 | 3.0 | 25.0 | 1.3–1.4 | 194–207 | 1.5 | 1.5 | 2.0 | 2.0 | [4] 2.0 |
| 14 | V | 5.0 | 2.5 | 19 | 1.4 | 194–207 | 2.0 | 2.0 | 2.0 | 1.8 | Black |
| 15 | V<br>Trimethylol propane diallyl ether | 5.0<br>2.0 | 2.0 | 27 | 1.1 | 190–198 | 1.5 | 1.5 | 1.5 | 1.5 | [1] 1.5 |
| 16 | V<br>Dimethyloctadiynediol (DMOD) | 5.0<br>2.0 | 2.0 | 31 | 1.1 | 190–196 | 1.0 | 1.0 | 1.5 | 2.0 | [5] 2.5 |
| 17 | XIV | 5.0 | 2.0 | 11.5 | 1.1–1.4 | 190–199 | 2.0 | 3.0 | 10 | | |
| 18 | XIV<br>TMPA | 5.0<br>2.0 | 2.5 | 15.5 | 1.1–1.4 | 188–196 | 1.0 | 2.0 | 5.0 | 10.0 | |
| 19 | VI | 5.0 | 2.0 | 7.5 | 1.4 | 190–198 | 1.0 | 1.0 | >15 | | |
| 20 | VIII | 5.0 | 9.0 | 8.5 | 1.4 | 160–192 | [6] 1.0 | [6] 2.0 | [6] >15 | | |
| 21 | III | 5.0 | 2.0 | 12.0 | 1.4–1.6 | 190–214 | 1.5 | 1.5 | >15 | | |
| 22 | IV | 5.0 | 2.0 | 8.5 | 1.4 | 189–196 | 1.0 | 1.0 | 1.0 | | |
| 23 | XXII | 5.0 | 1.0 | 8.5 | 1.2–1.8 | 180–197 | 2.2 | 2.0 | | | |
| 24 | IX | 5.0 | 1.0 | [7] 12–21 | 1.6–1.8 | 181–210 | 2.2 | 3.0 | 10.5 | 15 | 15 |
| 25 | V<br>TMPA | 5.0<br>2.0 | 1.0 | 22.0 | 1.3–1.8 | 178–200 | 0.5 | 0.5 | 0.5 | 0.5 | 0.5 |
| 26 | V<br>$CH_3CH_2-C'-(CH_2OH)_2$<br>$\quad\quad\quad\vert$<br>$\quad\quad CH_3OCH_2CH_2-CH_3$ | 5.0<br>2.0 | 1.0 | 25.5 | 1.1–1.8 | 180–200 | 0.7 | 0.7 | 0.7 | 0.7 | 0.7 |

TABLE II.—Continued

| Run | Stabilizer (numerals refer orthoester described previously) | Concentration, parts per hundred | Flux time, min. | Decomposition time after flux min. | Torque, kg. | Polymer (temp., ° C.) | Color (Gardner scale: 0=colorless; 15=brown 2 min. | 4 min. | 10 min. | 15 min. | 20 min. |
|---|---|---|---|---|---|---|---|---|---|---|---|
| 27 | X | 5.0 | 1.0 | 12 | 1.1-1.8 | 180-200 | 2.3 | 2.3 | 2.3 | | |
| 28 | X<br>TMPA | 5.0<br>2.0 | 1.0 | 16 | 1.2-1.8 | 176-196 | 1.0 | 1.0 | 1.0 | 1.5 | |
| 29 | XXIII | 5.0 | 1.0 | 18 | 1.3-1.8 | 182-204 | 1.2 | 1.2 | 1.2 | 1.2 | |
| 30 | XXIII<br>TMPA | 5.0<br>2.0 | 2.0 | 20 | 1.1-1.8 | 170-188 | 0 | 0.5 | 0.5 | 0.5 | |
| 31 | XI | 5.0 | 1.5 | 12.5 | 1.2-1.8 | 170-188 | 1.0 | 1.0 | 1.0 | | |
| 32 | XI<br>TMPA | 5.0<br>2.0 | 1.0 | 11 | 1.4-1.8 | 172-188 | 0 | 0 | 0.5 | | |
| 33 | XXV | 5.0 | 1.0 | 11 | 1.2-1.8 | 182-199 | 2.2 | 2.8 | 2.0 | | |
| 34 | VII | 5.0 | 1.5 | 17 | 1.3-1.8 | 186-203 | 2.0 | 2.3 | 2.5 | 3.0 | |
| 35 | VII<br>TMPA | 5.0<br>2.0 | 1.0 | 21 | 1.2-1.8 | 180-200 | 0.8 | 1.2 | 2.5 | 2.5 | 7.0 |
| 36 | XII | 5.0 | 0.7 | 15 | 1.1 1.8- | 170-200 | 2.2 | 2.2 | 2.2 | 2.5 | |
| 37 | XII<br>TMPA | 5.0<br>2.0 | 2.5 | 16 | 1.1-1.8 | 160-200 | 1.2 | 1.2 | 1.2 | 1.8 | |
| 38 | I | 5.0 | 1.0 | [7] 13 | 1.2-1.8 | 182-198 | 1.5 | 1.5 | 15 | | |
| 39 | V<br>TMPA<br>DMOD | 5.0<br>1.0<br>1.0 | 3.0 | 21 | 1.2-1.3 | 180-196 | 0.2 | 0.5 | 1.0 | 2.0 | 2.0 |
| 40 | V<br>TMPA | 5.0<br>2.0 | 1.0 | 22.0 | 1.3-1.8 | 178-200 | 0.5 | 0.5 | 0.5 | 0.5 | 0.5 |
| 41 | V<br>TMPA | 4.0<br>2.0 | 1.0 | 18.5 | | 180-199 | 0.5 | 0.8 | 0.8 | 0.8 | |
| 42 | V<br>TMPA | 3.0<br>2.0 | 1.0 | 13.0 | | 182-200 | 0.3 | 0.5 | 0.5 | | |
| 43 | V<br>TMPA | 2.0<br>2.0 | 1.5 | 8.0 | | 180-196 | 0.3 | 0.3 | | | |
| 44 | V<br>TMPA | 2.0<br>3.0 | 1.0 | 9.5 | | 180-196 | 0.3 | 0.3 | | | |
| 45 | V | 5.0 | 2.0 | 1.9 | 1.2-1.4 | 182-197 | 2.0 | 3.0 | 2.0 | 2.0 | 2.0 |
| 46 | V | 4.0 | 2.0 | 17 | 1.1-1.3 | 190-198 | 2.0 | 3.0 | 3.0 | 2.0 | |
| 47 | V | 3.0 | 2.0 | 10 | 1.2-1.4 | 178-202 | 2.5 | 3.0 | 2.5 | | |
| 48 | V | 2.0 | 2.0 | 7.5 | 1.2-1.4 | 186-196 | 2.0 | 2.5 | | | |
| 49 | V | 1.0 | 2.0 | 3.0 | 1.2-1.4 | 188-192 | 2.5 | 2.8 | | | |
| 50 | None | | 3.0 | 4.5 | 1.85 | 201-212 | 8 | 15 | [8] | | |
| 51 | XIII | 10.0 | 3.0 | 9.0 | 1.8 | 190-208 | 2.5 | 3.0 | >15 | >15 | |
| 52 | Triethylorthoformate | 10.0 | 3.0 | 9.5 | 1.3-1.4 | 184-193 | 3.0 | 6.0 | 13 | | |
| 53 | XX | 5.0 | 2.0 | 14.0 | 1.3-1.4 | 190-203 | 1.8 | 1.8 | 1.8 | 1.8 | |
| 54 | XX | 4.0 | 3.0 | 9.0 | 1.1-1.4 | 194-203 | 1.8 | 1.8 | 1.8 | | |
| 55 | XX | 3.0 | 2.5 | 6.5 | 1.4 | 193-201 | 1.8 | 1.8 | | | |
| 56 | XX | 2.0 | 2.5 | 4.5 | 1.3-1.4 | 194-200 | 2.5 | 3.0 | | | |
| 57 | XX | 1.0 | 4.0 | 2.0 | 1.3-1.5 | 180-188 | 1.0 | 2.0 | | | |
| 58 | XX<br>Benzyl alcohol | 4.0<br>1.0 | 2.0 | 15.5 | 1.3-1.4 | 190-206 | 0.5 | 0.5 | 0.5 | 0.5 | |
| 59 | XX<br>Benzyl alcohol | 3.0<br>2.0 | 2.5 | 11.0 | 1.3-1.4 | 190-200 | 0.5 | 1.0 | 1.5 | | |
| 60 | XX<br>Benzyl alcohol | 2.0<br>3.0 | 3.5 | 4.5 | 1.1-1.5 | 186-198 | 0 | 0.2 | | | |
| 61 | XX | 5.0 | 2.0 | 16 | 1.1-1.3 | 190-199 | 1.5 | 4.5 | 5.0 | 8.0 | |
| 62 | XX<br>TMPA | 5.0<br>2.0 | 2.0 | 19 | 1.1-1.4 | 188-206 | 1.0 | 1.5 | 4.0 | 4.0 | 12 |
| 63 | XXVI | 5.0 | 0 | 5.5-6.0 | 1.75-2.1 | 174-192 | 7.0 | Black | | | |
| 64 | XXVI | 5.0 | 0 | 6.5-7.5 | 1.6-1.9 | 193-208 | 5.0 | Black | | | |
| 65 | XXVII | 5.0 | 0 | 9-10 | 2.0-2.4 | 194-200 | 2.0 | >15 | Black | | |
| 66 | XXVIII | 5.0 | 0 | 9-10 | 1.8-2.1 | 180-218 | 6.0 | 10 | 12 | | |
| 67 | XXIX<br>Cetyl alcohol<br>Stearic acid | 5.0<br>2.0<br>0.5 | 0 | 14 | 1.8-2.4 | 190-212 | 2.0 | 2.5 | 5 | | |
| 68 | XXX<br>Cetyl alcohol<br>Stearic acid | 5.0<br>2.0<br>0.5 | 0 | 5.5 | 1.8-2.4 | 192-206 | 2.0 | 6.5 | | | |
| 69 | XII<br>Cetyl alcohol<br>Stearic acid | 5.0<br>2.0<br>0.5 | 0 | 15.5 | 1.4-2.4 | 190-210 | 2.0 | 2.0 | 2.0 | 3.0 | |
| 70 | XXVIII<br>Cetyl alcohol<br>Stearic acid | 5.0<br>2.0<br>0.5 | 0 | 7.5 | 1.7-2.4 | 190-214 | 7.5 | 7.5 | | | |
| 71 | Cetyl alcohol<br>Stearic acid | 5.0<br>0.5 | 0 | 5.5 | 1.9-2.1 | 192-210 | 15 | [9] >Black | | | |

[1] 1.5 after 25 min.
[2] Black at 23.5 min.
[3] 2.0 at 30 min.
[4] 2.0 at 25 min.
[5] 3.0 after 25 min. 3.5 after 30 min.
[6] After flux.
[7] Ill-defined.
[8] Black at 7.5 min.
[9] Greater than black.

I claim:

1. A thermally stabilized polyvinyl chloride resin composition comprising polyvinyl chloride and a compound of the formula

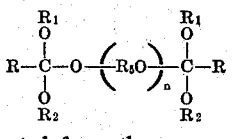

wherein R is selected from the group consisting of hydrogen, alkyl, phenyl, phenylalkyl, alkylphenylalkyl, halophenyl, nitrophenyl, and alkenyl; $R_1$ and $R_2$ are selected from the group consisting of alkyl phenyl, phenylalkyl, alkylphenyl and alkylphenylalkyl; and $R_5$ is selected from the group consisting of alkylene, phenylene, alkyl alkylene, alkenylene, alkenylalkoxyalkyl alkylene, and alknylene; and *n* has a value of from 1 to 4.

2. The composition of claim 1 which contains from about 1 to about 10% by weight of an alcohol having boiling point in excess of about 175° C., and having the formula $R(OH)_x$ wherein R is an organic radical and *x* has a value of from 1 to 6.

3. The composition of claim 1 wherein said orthoester has the Formula I

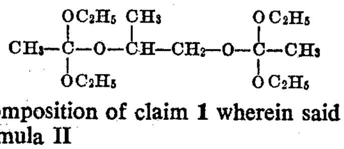

4. The composition of claim 1 wherein said orthoester has the Formula II

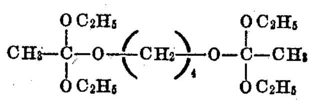

5. The composition of claim 1 wherein said orthoester has the Formula III
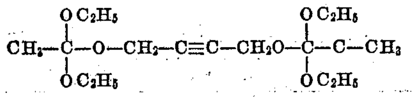
6. The composition of claim 1 wherein said orthoester has the Formula XXII
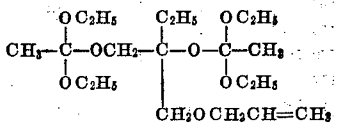
References Cited
UNITED STATES PATENTS
2,789,101 4/1957 Wilson ........ 260—45.85 XR
DONALD E. CZAJA, Primary Examiner
M. S. WELCH, Assistant Examiner
U.S. Cl. X.R.
260—23, 45.7, 45.85